(12) United States Patent
Kaneko et al.

(10) Patent No.: US 10,326,147 B2
(45) Date of Patent: Jun. 18, 2019

(54) CATALYST FOR FUEL CELLS AND METHOD FOR PRODUCING THE SAME

(71) Applicant: TOYOTA JIDOSHA KABUSHIKI KAISHA, Toyota-shi, Aichi-ken (JP)

(72) Inventors: Keiichi Kaneko, Mishima (JP); Takumi Taniguchi, Susono (JP); Makoto Adachi, Numazu (JP); Mayumi Yamada, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 606 days.

(21) Appl. No.: 14/784,115

(22) PCT Filed: Apr. 18, 2013

(86) PCT No.: PCT/JP2013/061518
§ 371 (c)(1),
(2) Date: Oct. 13, 2015

(87) PCT Pub. No.: WO2014/170990
PCT Pub. Date: Oct. 23, 2014

(65) Prior Publication Data
US 2016/0049664 A1 Feb. 18, 2016

(51) Int. Cl.
*H01M 4/92* (2006.01)
*H01M 8/1004* (2016.01)
*H01M 4/88* (2006.01)
*H01M 8/1018* (2016.01)

(52) U.S. Cl.
CPC ......... *H01M 4/926* (2013.01); *H01M 4/8878* (2013.01); *H01M 8/1004* (2013.01); *H01M 4/8825* (2013.01); *H01M 2008/1095* (2013.01)

(58) Field of Classification Search
CPC .. H01M 4/926; H01M 4/8878; H01M 8/1004; H01M 4/8825; H01M 2008/1095
See application file for complete search history.

(56) References Cited

U.S. PATENT DOCUMENTS

| | | |
|---|---|---|
| 2005/0075240 A1 | 4/2005 | Yamamoto |
| 2007/0031722 A1 | 2/2007 | Adzic et al. |
| 2010/0177462 A1 | 7/2010 | Adzic et al. |
| 2011/0155579 A1 | 6/2011 | Wang et al. |
| 2012/0010069 A1 | 1/2012 | Takehiro et al. |
| 2012/0245019 A1 | 9/2012 | Adzic et al. |
| 2013/0022899 A1 | 1/2013 | Arai et al. |
| 2013/0324391 A1 | 12/2013 | Shao |
| 2013/0324394 A1* | 12/2013 | Shao ............... B01J 37/06 502/339 |
| 2014/0024524 A1* | 1/2014 | Roh ................ H01M 4/926 502/185 |
| 2015/0318560 A1 | 11/2015 | Kaneko et al. |

FOREIGN PATENT DOCUMENTS

| | | |
|---|---|---|
| JP | 2005-135900 A | 5/2005 |
| JP | 2008-153192 A | 7/2008 |
| JP | 2010-182635 A | 8/2010 |
| JP | 2010-214330 A | 9/2010 |
| JP | 2010-250942 A | 11/2010 |
| JP | 2011181383 A | 9/2011 |
| JP | 2011526655 A | 10/2011 |
| JP | 2011-218278 A | 11/2011 |
| JP | 2012-000612 A | 1/2012 |
| JP | 2012-120949 A | 6/2012 |
| WO | 2006/112368 A1 | 10/2006 |
| WO | 2010005773 A1 | 1/2010 |
| WO | 2012/115624 A1 | 8/2012 |
| WO | WO-2012115624 A1 * | 8/2012 ............ B01J 37/06 |
| WO | WO-2014073114 A1 * | 5/2014 ......... H01M 4/8657 |

OTHER PUBLICATIONS

Koichi Matsutani et al., "Effect of Particle Size of Platinum and Platinum-Cobalt Catalysts on Stability Against Load Cycling", Platinum Metals Rev., 54 (4) (2010_, pp. 223-232.
United Sates Patent and Trademark Office, Non-Final Office Action dated Sep. 19, 2017 in U.S. Appl. No. 15/303,877, 8 pages.
United Sates Patent and Trademark Office, Notice of Allowance dated Jan. 22, 2018 in U.S. Appl. No. 15/303,877, 5 pages.

* cited by examiner

*Primary Examiner* — Philip A. Stuckey
(74) *Attorney, Agent, or Firm* — Hunton Andrews Kurth LLP

(57) ABSTRACT

The present invention is to provide a catalyst for fuel cells, which is able to inhibit gas diffusion resistance and shows high IV characteristics far more than conventional fuel cell catalysts, and a method for producing the catalyst. Disclosed is a catalyst for fuel cells, comprising fine catalyst particles, each of which comprises a palladium-containing particle and an outermost layer containing platinum and covering the palladium-containing particle, and a carrier on which the fine catalyst particles are supported, wherein the catalyst for fuel cells satisfies $0.9 \times S1 \leq S2$ in which S1 is a BET specific surface area of a material for the carrier, and S2 is a BET specific surface area of the carrier in the catalyst for fuel cells.

10 Claims, 5 Drawing Sheets

US 10,326,147 B2

CATALYST FOR FUEL CELLS AND METHOD FOR PRODUCING THE SAME

CROSS-REFERENCE TO RELATED APPLICATION

This is a national phase application based on the PCT International Patent Application No. PCT/JP2013/061518 filed Apr. 18, 2013, the entire contents of which are incorporated herein by reference.

TECHNICAL FIELD

The present invention relates to a catalyst for fuel cells, which is able to inhibit gas diffusion resistance and shows high IV characteristics far more than conventional catalysts, and a method for producing the catalyst.

BACKGROUND ART

A fuel cell converts chemical energy directly into electric energy by supplying a fuel and an oxidant to two electrically-connected electrodes each and electrochemically oxidizing the fuel. Unlike thermal power generation, a fuel cell is not limited by the Carnot cycle; therefore, it shows high energy conversion efficiency. A fuel cell is generally constituted of a stack of single cells, each of which has a membrane electrode assembly as the basic structure, in which an electrolyte membrane is sandwiched between a pair of electrodes.

Supported platinum and platinum alloy materials have been used as the catalyst of the anode and cathode electrodes of a fuel cell. However, platinum in an amount that is required of today's electrode catalyst, is still expensive to realize commercial mass production of fuel cells. Accordingly, studies to reduce the amount of platinum contained in the cathode and anode of a fuel cell by combining platinum with a less expensive metal, have been carried out.

In recent years, as a catalyst for electrodes of fuel cells, core-shell fine catalyst particles have attracted attention. From the viewpoint of increasing the coverage of a core with a shell, generally in the area of methods for producing core-shell fine catalyst particles, such a method that a monatomic layer is formed in advance on a core surface by an under potential deposition method such as Cu under potential deposition method (hereinafter may be referred to as Cu-UPD) and then the monatomic layer is substituted with a shell, is known.

As a technique using the Cu-UPD method, a method for forming a catalyst material is disclosed in Patent Literature 1, in which a catalyst material containing a platinum atomic layer is produced by substituting a copper atomic layer with a platinum atomic layer in the presence of a surfactant.

CITATION LIST

Patent Literature 1: International Publication No. WO2012/115624

SUMMARY OF INVENTION

Technical Problem

In claim 9 of Patent Literature 1, it is mentioned to use citric acid, etc., as a surfactant. However, as will be described below, as a result of research conducted by the inventors of the present invention, it has been found that when citric acid is used in the formation of a platinum shell layer following Cu-UPD, citric acid-modified products derived from citric acid residues are formed on the surface of the carrier of the thus-produced catalyst and result in a problem of affecting catalyst activity.

The present invention was achieved in light of the above circumstance. An object of the present invention is to provide a catalyst for fuel cells, which is able to inhibit gas diffusion resistance and shows high IV characteristics far more than conventional fuel cell catalysts, and a method for producing the catalyst.

Solution to Problem

The catalyst for fuel cells according to the present invention comprises fine catalyst particles, each of which comprises a palladium-containing particle and an outermost layer containing platinum and covering the palladium-containing particle, and a carrier on which the fine catalyst particles are supported, wherein the catalyst for fuel cells satisfies $0.9 \times S1 \leq S2$ in which S1 is the BET specific surface area of a material for the carrier, and S2 is the BET specific surface area of the carrier in the catalyst for fuel cells.

In the catalyst for fuel cells according to the present invention, the material for the carrier can be a carbonaceous material.

The catalyst for fuel cells according to the present invention preferably has a mass activity of 450 $(A/g_{ft})$ or more and a specific activity of 4.0 $(A/m^2)$ or more.

The method for producing a catalyst for fuel cells according to the present invention is a method for producing a catalyst for fuel cells, the catalyst comprising fine catalyst particles, each of which comprises a palladium-containing particle and an outermost layer containing platinum and covering the palladium-containing particle, and a carrier on which the fine catalyst particles are supported, wherein the method comprises: preparing a carrier on which palladium-containing particles are supported; covering the palladium-containing particles with a monatomic layer; synthesizing the fine catalyst particles by substituting the monatomic layer with the outermost layer containing platinum in the presence of an additive; and washing a catalyst precursor in which the fine catalyst particles are supported on the carrier with water, and wherein the ratio of the total mass of the additive used for the synthesis of the fine catalyst particles and a derivative thereof, both of which remain in the catalyst for fuel cells after the washing, to the total mass of the additive is 2.5% by mass or less.

In the production method of the present invention, preferably, the catalyst precursor is dispersed and washed in water when it is washed with water.

In the production method of the present invention, preferably, the temperature of the water used for the washing is 30° C. or more and less than 100° C.

In the production method of the present invention, preferably, the additive is at least one surfactant selected from the group consisting of citric acid and ethylenediaminetetraacetic acid (EDTA), and sodium salts and potassium salts thereof.

In the production method of the present invention, preferably, an acid is further used when the monatomic layer is substituted with the outermost layer.

In the production method of the present invention, when the carrier on which the palladium-containing particles are supported is prepared, the carrier is preferably subjected to an acid treatment.

The fuel cell of the present invention is a fuel cell comprising a unit cell, which comprises a membrane electrode assembly in which an anode electrode comprising at least an anode catalyst layer is disposed on one side of a polyelectrolyte membrane and a cathode electrode comprising at least a cathode catalyst layer is disposed on another side of the polyelectrolyte membrane, wherein the above catalyst for fuel cells or a catalyst for fuel cells produced by the above production method is contained in at least any one of the anode catalyst layer and the cathode catalyst layer.

Advantageous Effects of Invention

According to the present invention, with respect to the BET specific surface area of the material for the carrier, the BET specific surface area of the carrier in the catalyst for fuel cells is 90% or more; therefore, the catalyst of the present invention can inhibit gas diffusion resistance and shows high IV characteristics far more than conventional fuel cell catalysts having a core-shell structure.

DESCRIPTION OF EMBODIMENTS

1. Catalyst for Fuel Cells

The catalyst for fuel cells according to the present invention comprises fine catalyst particles, each of which comprises a palladium-containing particle and an outermost layer containing platinum and covering the palladium-containing particle, and a carrier on which the fine catalyst particles are supported, wherein the catalyst for fuel cells satisfies $0.9 \times S1 \leq S2$ in which S1 is the BET specific surface area of a material for the carrier, and S2 is the BET specific surface area of the carrier in the catalyst for fuel cells.

As described above, in the area of core-shell catalyst production methods, as a prior art, it is known to add citric acid in the substitution with a platinum shell layer.

However, as a result of detailed research made by the inventors of the present invention, it has been found that when a post-treatment step (such as acid treatment step or firing step) is carried out under such a conventional condition that the removal of citric acid is insufficient, the citric acid physically adsorbing on the carrier surface is modified. Especially when a carrier having hydrophilic functional groups is used, such as a carbonaceous material, a dehydration-condensation reaction occurs between the functional groups on the surface of the carrier and the citric acid, thus forming a citric acid-modified product. The following formula (1) schematically shows the dehydration-condensation reaction between the citric acid and the functional groups on the carrier surface. In the formula (1), an ellipse described as "carrier" indicates the carrier, and a hydroxyl group (—OH) and a carboxyl group (—COOH) present on the carrier surface indicate the hydrophilic functional groups on the carrier surface.

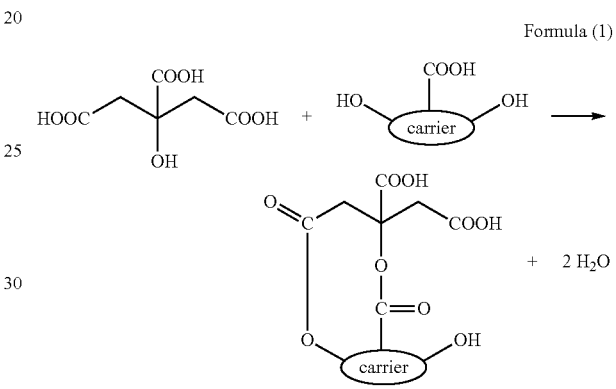

Formula (1)

As shown in the formula (1), the citric acid-modified product is strongly bound to the functional groups on the carrier surface through ester bonds. Accordingly, when a core-shell catalyst containing such a citric acid-modified product is used in the electrode for fuel cells, the adsorption of an ionomer on the carrier surface is inhibited by the citric acid-modified product. The ionomer not adsorbing on the carrier surface becomes a free ionomer and floats in the electrode.

Figure 8:
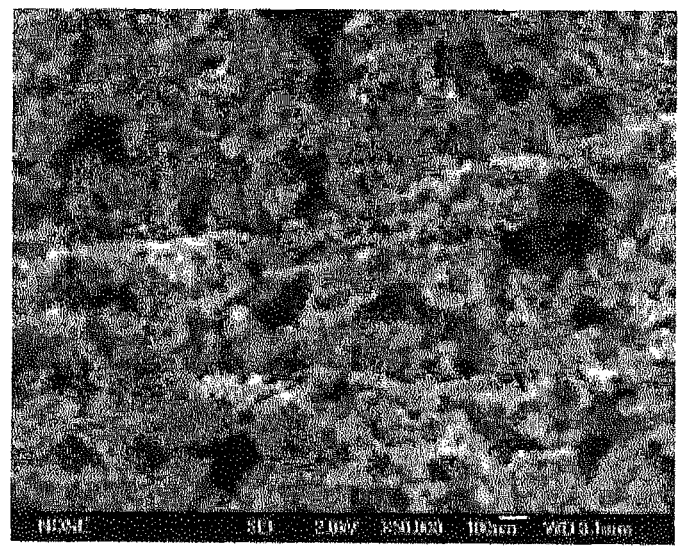
FIG. 8 is an SEM image of a section of an electrocatalyst layer containing a conventional core-shell catalyst produced using citric acid.
Figure 9:
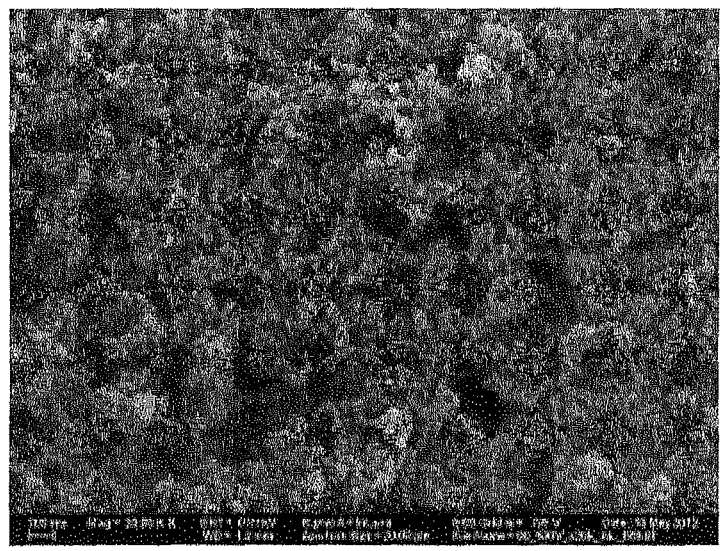
FIG. 9 is an SEM image of a section of an electrocatalyst layer containing a conventional platinum-cobalt alloy catalyst.

FIG. 8 is an SEM image of a section of an electrocatalyst layer containing a conventional core-shell catalyst produced using citric acid. FIG. 9 is an SEM image of a section of an electrocatalyst layer containing a conventional platinum-cobalt alloy catalyst. As is clear from FIG. 8, in the conventional core-shell catalyst produced using citric acid, the presence of a free ionomer was confirmed (a relatively white part that is linear in the horizontal direction). Meanwhile, as is clear from FIG. 9, any free ionomer was not found in the platinum-cobalt alloy catalyst produced without the use of citric acid. Accordingly, it can be said that such a free ionomer generation is a problem specific to the catalyst produced using citric acid.

The free ionomer blocks gas conducting paths in the electrocatalyst layer or increases the amount of hydrophilic pores in the electrocatalyst layer; therefore, it may be a cause for flooding especially under a low-temperature, excessive-humidity condition. As a result, gas diffusivity in the electrode catalyst layer is rapidly deteriorated, and concentration overvoltage that controls high current density range characteristics is increased too much, thereby causing a problem of low power generation performance of a fuel cell thus produced.

As a result of diligent research, the inventors of the present invention have found that the catalyst performance of the catalyst for fuel cells can be increased by removing and decreasing the citric acid physically adsorbing on the surface of the carrier in the catalyst precursor of the catalyst for fuel cells before the post-treatment step. A concrete method for removing the citric acid from the carrier surface is a method for washing the catalyst precursor with warm water after the production of the catalyst precursor and before the post-treatment step. The inventors of the present invention have found that the IV characteristics of the catalyst for fuel cells thus obtained can be increased by, upon the washing with warm water, measuring the conductivity of the water after the washing, and repeating the washing until the conductivity becomes equal to or less than a specific value. The inventors have also found that the BET specific surface area of the thus-obtained catalyst for fuel cells is higher than the BET specific surface area of conventional core-shell catalysts. Based on these findings, the inventors finally achieved the present invention.

In the present invention, the term "palladium-containing particles" is used as a general term for palladium particles and palladium alloy particles.

As will be described below, the outermost layer covering the palladium-containing particles contains platinum. Platinum is excellent in catalytic activity, especially in oxygen reduction reaction (ORR) activity. While the lattice constant of platinum is 3.92 Å, the lattice constant of palladium is 3.89 Å and is a value that is within a range of 5% either side of the lattice constant of platinum. Accordingly, no lattice mismatch occurs between platinum and palladium, and palladium is sufficiently covered with platinum.

In the present invention, from the viewpoint of reducing costs, it is preferable that the palladium-containing particles contain a metal material that is less expensive than the below-described materials used for the outermost layer. It is also preferable that the palladium-containing particles contain a metal material that contributes to electrical continuity.

From the above-mentioned viewpoints, in the present invention, the palladium-containing particles are preferably palladium particles or particles of an alloy of palladium with a metal such as iridium, rhodium or gold. In the case of using palladium alloy particles, the palladium alloy particles can contain only one kind of metal or two or more kinds of metals in combination with palladium.

The average particle diameter of the palladium-containing particles is not particularly limited, as long as it is equal to or less than the average particle diameter of the below-described fine catalyst particles. From the point of view that the ratio of surface area to cost per palladium-containing particle is high, the average particle diameter of the palladium-containing particles is preferably 30 nm or less, more preferably 5 to 10 nm.

In the present invention, the average particle diameter of the palladium-containing particles and the fine catalyst particles is calculated by a conventional method. An example of the method for calculating the average particle diameter of the palladium-containing particles and the fine catalyst particles is as follows. First, the particle diameter of a particle shown in a TEM image at a magnification of 400,000 to 1,000,000 times is calculated, provided that the particle is spherical. Such a particle diameter calculation by TEM observation is carried out on 200 to 300 particles of the same type, and the average of these particles is deemed as the average particle diameter.

In the present invention, it is preferable that the outermost layer on the surface of the fine catalyst particles has high catalytic activity. As used herein, "catalytic activity" means the activity of the catalyst for fuel cells, especially the oxygen reduction reaction (ORR) activity of the same.

The outermost layer can contain only platinum, or it can contain iridium, ruthenium, rhodium or gold in combination with platinum. In the case of using a platinum alloy for the outermost layer, the platinum alloy can contain only one kind of metal or more kinds of metals in combination with platinum.

From the point of view that the elution of core particles can be further inhibited, the coverage of the palladium-containing particle with the outermost layer is generally 0.5 to 2, preferably 0.8 to 1. When the coverage of the palladium-containing particle with the outermost layer is less than 0.5, the palladium-containing particles may be eluted during an electrochemical reaction and, as a result, the fine catalyst particles may deteriorate.

Here, "the coverage of the palladium-containing particle with the outermost layer" means the ratio of the area of the palladium-containing particle covered with the outermost layer provided that the total surface area of the palladium-containing particle is 1. An example of the method for calculating the coverage will be described. First, a metal content (A) in the outermost layer of the fine catalyst particle is measured by inductively coupled plasma mass spectrometry (ICP-MS) or the like. Meanwhile, the average particle diameter of the fine catalyst particles is measured with a transmission electron microscope (TEM), etc. From the measured average particle diameter, the number of atoms on the surface of a particle having the same diameter as the average particle diameter is estimated. Then, a metal content (B) in the outermost layer in the case of substituting one atomic layer on the particle surface with the metal contained in the outermost layer, is estimated. The value obtained by dividing the outermost layer metal content (A) by the outermost layer metal content (B) is the coverage of the palladium-containing particle with the outermost layer.

The outermost layer covering the palladium-containing particles is preferably a monatomic layer. This is because there are such advantages that the catalytic performance of the outermost layer of the fine catalyst particles having such a structure is extremely higher than fine catalyst particles in which the outermost layer is composed of two or more atomic layers, and that the amount of the outermost layer covering the palladium-containing particles is small and results in low material costs.

The lower limit of the average particle diameter of the fine catalyst particles is preferably 4 nm or more, more preferably 5 nm or more, and the upper limit is preferably 40 nm or less, more preferably 10 nm or less.

The material for the carrier can be a carbonaceous material. Because of this, electroconductivity can be imparted to the electrocatalyst layer when the catalyst for fuel cells according to the present invention is used for the electrocatalyst layer of a fuel cell.

Concrete examples of carbonaceous materials that can be used as the carrier include electroconductive carbonaceous materials including carbon particles and carbon fibers, such as Ketjen Black (product name; manufactured by: Ketjen Black International Company), Vulcan (product name; manufactured by: Cabot), Norit (product name; manufactured by: Norit), Black Pearls (product name; manufactured by: Cabot) and Acetylene black (product name; manufactured by: Chevron).

Also, the material for the carrier can be a metal material such as metal particles or metal fibers.

One of main characteristics of the present invention is that the catalyst for fuel cells satisfies $0.9 \times S1 \leq S2$ in which S1 is the BET specific surface area (m²/g) of the material for the carrier, and S2 is the BET specific surface area (m²/g) of the carrier in the catalyst for fuel cells.

As described above, in the covering of the palladium-containing particles with the outermost layer containing platinum, when an additive such as citric acid is used, a modified product of the additive physically adsorbs on the carrier surface. As a result, the BET specific surface area of the carrier surface is decreased by the modified product, so that the conventional BET specific surface area (S2) of the carrier in the catalyst for fuel cells does not exceed 70% of the BET specific surface area (S1) of the material for the carrier.

The BET specific surface area S2 is preferably $0.95 \times S1 \leq S2$, more preferably $0.99 \times S1 \leq S2$. Also, the BET specific surface area S2 does not have any particular upper limit. For example, it can be $S2 \leq 2 \times S1$.

In the present invention, the BET specific surface area is a specific surface area obtained by the BET method (such as $N_2$ gas absorption method).

Hereinafter, an example of the measurement of the BET specific surface areas S1 and S2 will be described. First, the BET specific surface area of the material for the carrier is measured and considered as S1 (m²/g-carrier). Next, the catalyst for fuel cells is produced by supporting the fine catalyst particles on the material for the carrier. Then, the BET specific surface area S (m²/g-catalyst for fuel cells) of the catalyst for fuel cells is measured, and a metal supported ratio x (% by mass) is measured by inductively coupled plasma mass spectrometry (ICP-MS). The thus-measured S is the BET specific surface area of the whole catalyst for fuel cells. Finally, from the values S and x, the BET specific surface area S2 (m²/g-carrier) of the carrier in the catalyst for fuel cells is calculated by the following formula (2):

$$S2 = S \times \{(100-x)/100\} \quad \text{Formula (2):}$$

By the formula (2), the BET specific surface area S2 of only the carrier (excluding the contribution of the metal) can be calculated.

When the catalyst for fuel cells according to the present invention is produced using the additive, generally, traces of the modified product of the additive can be found in the catalyst for fuel cells. To find the traces of the additive-modified product, for example, there may be mentioned a method in which a catalyst for fuel cells is produced using an isotopically-labelled additive (such as citric acid having carbon-13 and/or oxygen-17) and solid-state $^{13}$C NMR spectroscopy and/or solid-state $^{17}$O NMR spectroscopy is carried out on the thus-obtained catalyst for fuel cells or $^{13}$C NMR spectroscopy and/or $^{17}$O NMR spectroscopy is carried out on a solution in which the catalyst for fuel cells is dissolved, thereby finding the traces of the additive-modified product. To find the traces of the additive-modified product, the Fourier transform infrared (FT-IR) absorption spectrum measurement method can be also used.

The catalyst for fuel cells according to the present invention preferably has a mass activity of 450 (A/$g_{Pt}$) or more and a specific activity of 4.0 (A/m²) or more.

The structure of conventional carbon-supported platinum catalysts is not impaired when high-temperature firing is carried out in the production thereof, and the catalytic performance is not adversely affected. However, in the case of the catalyst for fuel cells according to the present invention, when the firing temperature is too high, the structure of the outermost layer containing platinum may not be maintained. On the other hand, impurities such as additives (e.g., citric acid) cannot be removed without increasing the firing temperature high enough.

Accordingly, as described above, it is an effect specific to the catalyst for fuel cells according to the present invention, that the mass activity and specific activity can be kept as high as above while maintaining the BET specific surface area S2 of the carrier of the catalyst for fuel cells sufficiently high. The catalyst for fuel cells having the above-mentioned mass activity and specific activity and being able to maintain the core-shell structure, is considered to have been subjected to firing at relatively low temperature. There has never been such a core-shell catalyst that the BET specific surface area of the carrier is as high as above within the constraints of low-temperature treatment.

The mass activity of the catalyst for fuel cells according to the present invention is preferably 500 (A/$g_{Pt}$) or more, more preferably 550 (A/$g_{Pt}$) or more. The specific activity of the catalyst for fuel cells according to the present invention is preferably 4.2 (A/m²) or more, more preferably 4.4 (A/m²) or more.

As described above, in the catalyst for fuel cells according to the present invention, the BET specific surface area S2 of the carrier is sufficiently large. Therefore, in a fuel cell including the catalyst for fuel cells, the carrier surface can absorb a sufficient amount of ionomer and, as a result, there is no possibility that gas conducting paths in the electrocatalyst layer are blocked by free ionomer or there is no possibility of flooding derived from free ionomer; moreover, gas diffusion resistance can be inhibited, and high IV characteristics are exhibited.

2. Method for Producing a Catalyst for Fuel Cells

The method for producing a catalyst for fuel cells according to the present invention is a method for producing a catalyst for fuel cells, the catalyst comprising fine catalyst particles, each of which comprises a palladium-containing particle and an outermost layer containing platinum and covering the palladium-containing particle, and a carrier on which the fine catalyst particles are supported, wherein the method comprises: preparing a carrier on which palladium-containing particles are supported; covering the palladium-containing particles with a monatomic layer; synthesizing the fine catalyst particles by substituting the monatomic layer with the outermost layer containing platinum in the presence of an additive; and washing a catalyst precursor in which the fine catalyst particles are supported on the carrier with water, and wherein the ratio of the total mass of the additive used for the synthesis of the fine catalyst particles and a derivative thereof, both of which remain in the catalyst for fuel cells after the washing, to the total mass of the additive is 2.5% by mass or less.

The method for producing the catalyst for fuel cells according to the present invention includes the steps of: (1) preparing the material; (2) covering the palladium-containing particles with a monatomic layer; (3) synthesizing the fine catalyst particles by substituting the monatomic layer with the outermost layer; and (4) washing the catalyst precursor with water. The present invention is not limited to these four steps only. For example, it can include the below-described filtering step, washing step, drying step, etc., in addition to the four steps.

Hereinafter, the steps (1) to (4) and other steps will be described in order.

2-1. Step of Preparing the Material

This is a step of preparing the carrier on which the palladium-containing particles are supported. The palladium-containing particles and carrier that can be used in the present invention are as described above.

The carrier on which the palladium-containing particles are supported can be a previously-prepared carrier or a commercially-available carrier. To support the palladium-containing particles on the carrier, any conventional supporting method can be used. In the case of using palladium alloy particles, the preparation of the palladium alloy can be carried out concurrently with the supporting of the palladium alloy particles on the carrier.

In this step, preferably, the carrier on which the palladium-containing particles are supported is subjected to an acid treatment. As used herein, "acid treatment" encompasses such a treatment that the carrier on which the palladium-containing particles are supported is simply added to an acid solution, and such a treatment that the carrier on which the palladium-containing particles are supported is added to an acid solution and then a potential is applied thereto.

The acid solution which is preferably used in the present invention is an acid solution having an oxidation power that is sufficient to remove oxides on the surface of the palladium-containing particles. Concrete examples thereof include nitric acid, sulfuric acid, perchloric acid, hydrochloric acid and hypochlorous acid. Especially, from the viewpoint of having an oxidation power that is sufficient to dissolve mainly palladium, sulfuric acid is preferred. The concentration of the acid solution and the control of the acid solution atmosphere by bubbling can be appropriately adjusted depending on the type of the acid solution.

From the point of view that the potential treatment is evenly and quickly carried out on all of the palladium-containing particles, it is preferable that in the acid solution in which the palladium-containing particles are dispersed, the palladium-containing particles do not aggregate to each other and are uniformly dispersed in the acid solution.

When a potential is applied to the dispersion in the acid treatment, the applied potential is not particularly limited. For example, a 0.1 to 1.1 V square wave pattern can be applied.

Especially, a potential range of 0.4 to 0.6V (vs. RHE) is preferred since it is a potential range that enables the removal of oxides (oxide film) on the surface of the palladium-containing particles. A potential of less than 0.4 V (vs. RHE) may cause the palladium to occlude hydrogen. On the other hand, a potential of more than 0.6 V (vs. RHE) may cause metals in the palladium-containing particles such as palladium to be eluted. Even when the applied potential is about 0.2 V below the lower limit of 0.4 V (vs. RHE), the cleaning effect of removing the oxides on the surface of the palladium-containing particles is comparable to the effect of a sweep in a potential range of 0.4 to 0.6 V (vs. RHE). The range of the potential applied in the acid treatment is preferably a range of 0.4 to 0.45 V (vs. RHE).

In the acid treatment, the potential treatment can be carried out by fixing the potential at a predetermined value, as long as the potential is in a range of 0.4 to 0.6 V (vs. RHE), or a sweep in a predetermined potential range can be carried out one or more times. From the point of view that desorption of materials adsorbing on the surface of the palladium-containing particles can be repeated and oxides present on the surface can be efficiently removed, the potential treatment carried out in the acid treatment is preferably such a potential treatment that the potential is swept between any two potentials in a range of 0.4 to 0.6 V (vs. RHE).

When the potential is swept between any two potentials, the number of sweeps can be appropriately controlled depending on the reaction scale. For example, the number of sweeps is around 1 to 1,000 cycles with respect to 1 to 100 g of the palladium-containing particles.

In the acid treatment, the potential applying time is not particularly limited, as long as it is a time during which the oxides on the surface of the palladium-containing particles can be sufficiently removed. The time can be appropriately controlled depending on the synthesis scale. For example, in the case of a potential treatment in which the potential is swept between any two potentials in a range of 0.4 to 0.6 V (vs. RHE), a state in which the trace of the waveform of the potential treatment almost overlaps with the trace of the waveform of the last sweep and, even after the potential is swept several times, the traces of the waveforms of the potential sweeps become almost the same as each other can serve as an indication to finish the applying of the potential. In this case, current fluctuation is constant with respect to the potential treatment, and it can be considered that almost all of the oxides on the surface of the palladium-containing particles disappeared.

The potential applying time is, for example, about 1 to 24 hours with respect to 1 to 100 g of the palladium-containing particles.

A concrete example of the acid treatment is as follows. First, a palladium-supported carbon is added to an acid solution and appropriately dispersed therein. Then, a 0.1 to 1.1 V square wave pattern potential is swept back and forth. At this time, it is preferable to remove oxygen and so on from the acid solution as much as possible, by bubbling an inert gas such as nitrogen gas or argon gas into the acid solution in advance.

As just described, by carrying out the potential treatment in advance on the palladium-containing particles before being coated with platinum, oxides adsorbing on the surface of the palladium-containing particles, such as palladium oxide, can be removed, so that the surface of the palladium-containing particles can be cleaned. By setting the applied potential to be in a range of 0.4 to 0.6 V (vs. RHE), preferably in a range of 0.4 to 0.45 V (vs. RHE), there is no possibility that metals such as palladium are eluted from the palladium-containing particles, and that hydrogen is occluded by the palladium. Therefore, there is no possibility that new oxides appear on the surface of the palladium-containing particles.

2-2. Step of Covering the Palladium-Containing Particles with a Monatomic Layer This is a step of covering the palladium-containing particles with a monatomic layer.

A concrete embodiment of this step is such that a monatomic layer is formed on the surface of the palladium-containing particles by underpotential deposition. It is preferable to use Cu-UPD as the underpotential deposition. By Cu-UPD, the amount of copper deposited on the palladium-containing particles can be uniform when the palladium-containing particles are covered with copper.

In the case of using a platinum layer as the outermost layer, since the lattice constant of palladium and the lattice constant of platinum are close to each other, the catalyst for fuel cells which has high coverage with platinum and excellent durability can be produced by Cu-UPD.

A concrete example of this step is as follows. First, a copper compound such as copper sulfate is added to the reaction container subjected to the acid treatment. Next, a potential which is approximately equal to the potential of the underpotential deposition (UPD potential) is applied to the reaction mixture so that only one atomic layer of copper is deposited on the surface of the palladium-containing particles. The potential is maintained as it is until the current value comes close to 0 A and reaches a plateau (that is, until the reduction reaction of copper ends), thereby causing the covering with the copper Monatomic layer to progress.

2-3. Step of Synthesizing the Fine Catalyst Particles by Substituting the Monatomic Layer with the Outermost Layer This is a step of synthesizing the fine catalyst particles by substituting the monatomic layer with the outermost layer containing platinum in the presence of an additive. Hereinafter, the case of forming a platinum layer as the outermost layer will be described.

First, a platinum compound such as $K_2PtCl_4$ and an additive are appropriately dissolved in preferably acid, thereby preparing a solution containing a platinum element. It is preferable to bubble an inert gas such as nitrogen into the solution containing the platinum element, in advance.

As the additive added to the solution containing the platinum element, surfactants such as citric acid, sodium salt of citric acid, potassium salt of citric acid, ethylenediaminetetraacetic acid (hereinafter may be referred to as EDTA), sodium salt of EDTA and potassium salt of EDTA are preferred. These additives form a complex with the platinum in the solution, so that the dispersibility of the platinum element in the solution is increased and, as a result, the surface of the palladium-containing particles can be uniformly covered with the outermost layer. These additives can be used alone or in combination of two or more kinds.

Examples of the acid added to the solution containing the platinum element include sulfuric acid, nitric acid, perchloric acid, hydrochloric acid and hypochlorous acid. Of them, sulfuric acid is preferred.

The solution containing the platinum element is gradually added to the above-mentioned reaction mixture containing the palladium-containing particles. After the addition is completed, the reaction mixture is stirred until the self-potential of the reaction mixture reaches a plateau, thereby completing the substitution reaction of the copper with the platinum and synthesizing the fine catalyst particles. The dispersion containing the fine catalyst particles thus synthesized is appropriately filtered, and the resulting product is used in the next step.

2-4. Step of Washing the Catalyst Precursor with Water

This is a step of washing the catalyst precursor in which the fine catalyst particles are supported on the carrier with water.

In the present invention, the catalyst precursor indicates at least the fine catalyst particles and the carrier supporting the fine catalyst particles, both of which are in a stage prior to the water washing in this step. The catalyst precursor is changed into the catalyst for fuel cells by, for example, the water washing of this step and the below-described acid treatment, hydrogen bubbling, firing, etc.

In this step, cold water can be used as the water, or warm water can be used. Or, cold water and warm water can be used in combination for the washing. More specifically, the catalyst precursor can be washed with cold water at less than 30° C. and then with warm water.

The temperature of the warm water used in the present invention is preferably 30° C. or more and less than 100° C. When the temperature of the warm water is less than 30° C., the effect of eluting the additive may be small. When the temperature of the warm water is 100° C. or more, the warm water is turned into steam and may be unsuitable for the washing or may impair the structure of the synthesized fine catalyst particles. The temperature of the warm water is more preferably 40 to 90° C., still more preferably 50 to 70° C.

This step is preferably a step in which the catalyst precursor is dispersed and washed in water, preferably in warm water. The method for dispersing the catalyst precursor in water is not particularly limited. For example, there may be mentioned an ultrasonic dispersion method, a method for pulverizing the catalyst precursor with a ball mill and then adding it to water, and a method for dispersing the catalyst precursor with a device that uses shear stress, such as Nanomizer. Of them, the ultrasonic dispersion method is preferably used, from the point of view that the structure of the fine catalyst particles is relatively less likely to be impaired.

When, unlike this step, the catalyst precursor is not subjected to the washing with water, especially to the washing with warm water, it is difficult to absolutely remove the additive physically adsorbing on the carrier surface. This is because bond formation between the additive and the carrier surface is promoted by acid or heat in the below-mentioned acid treatment step or firing step.

It is preferable to repeat this step twice or more, as needed. At this time, as an indication to finish the washing, there may be mentioned the conductivity of the water used for the washing (hereinafter may be referred to as washing water), for example. The conductivity of the washing water serves as an indicator of the amount of the additive in the washing water. Therefore, when the conductivity of the washing water is sufficiently high, it is considered that the amount of the additive physically adsorbing on the carrier surface is still large, and it can be determined that it is needed to wash the catalyst precursor again.

In the present invention, it is preferable to repeat this step until the conductivity of the washing water becomes 10 μS/cm or less. In particular, the washing water means a supernatant obtained by adding 10 g of the catalyst precursor per liter of water in a container and dispersing the precursor.

As just described, by measuring the conductivity of the washing water every time the washing is finished, the remaining ratio of the additive and so on remaining on the carrier surface can be checked easily, point by point.

In the present invention, the ratio of the total mass of the additive used for the synthesis of the fine catalyst particles and a derivative thereof, both of which remain in the catalyst for fuel cells after the washing (hereinafter may be referred to as the additive and so on) to the total mass of the additive (hereinafter may be referred to as the remaining ratio of the additive and so on) is 2.5% by mass or less. In the present invention, as the "derivative of the additive", there may be mentioned a modified product and so on produced on the carrier surface by the reaction of the above-described additive with the functional groups on the carrier surface, for example.

It is difficult to quantitate the amount of the additive and so on directly from the catalyst for fuel cells. Accordingly, in general, the remaining ratio of the additive and so on can be calculated by calculating the ratio of the total mass of the additive removed in the washing step and subsequent steps to the total mass of the additive used for the synthesis (hereinafter the ratio may be referred to as additive removal ratio) and subtracting the additive removal ratio (%) from 100%.

The relationship between the conductivity of the washing water and the remaining ratio of the additive and so on varies depending on the type of the additive. For example, the remaining ratio of citric acid and a citric acid derivative is 2.4% by mass when the conductivity of the washing water is 10 μS/cm.

2-5. Other Steps

After the water washing step (warm water washing step), the thus-obtained catalyst for fuel cells can be subjected to acid treatment, hydrogen bubbling, firing, etc.

The acid treatment and hydrogen bubbling of the catalyst for fuel cells are not particularly limited, as long as they are carried out by methods that can remove impurities without impairing the covering structure of the fine catalyst particles.

(a) Acid Treatment Step

The acid treatment step is a step of bringing the catalyst precursor into contact with an acid solution which dissolves palladium more preferentially than platinum.

The acid solution used in the present invention is one which dissolves palladium more preferentially than platinum. It has oxidation power which is sufficient to elute palladium, and it can minimize platinum elution.

In general, the solubility of an elemental metal is determined by the ionization tendency of the elemental metal, that is, the standard electrode potential $E^0$ (that is, electrode potential in an aqueous solution at 25° C. and pH=0) of the elemental metal. While the standard electrode potential $E^0_{Pd}$ of palladium is +0.915 V (vs. SHE), the standard electrode potential $E^0_{Pt}$ of platinum is +1.188 V (vs. SHE). Therefore, the ionization tendency of palladium is larger than that of platinum.

However, the ionization tendency by the standard electrode potential $E^0$ is limited to the inside of the aqueous solution at 25° C. and pH=0, and it is also a value that a metal in a bulk state has. Therefore, it is just a rough indication, and it is not always possible to selectively elute palladium than platinum, depending on the treatment conditions such as temperature and acid concentration. Since the dissolution-deposition reaction is an equilibrium reaction, it is not always true that platinum never elutes even in an ideal acid solution. Also, the fine catalyst particle has a nanoscale size, so that the actual platinum elution potential or palladium elution potential is lower than the standard electrode potential $E^0$. Therefore, it is preferable to determine the acid treatment conditions (acid type, acid concentration, temperature, time, etc.) by considering beforehand the amount of palladium eluted from the fine catalyst particles actually used and that of platinum eluted from the same.

In particular, the acid solution used in the present invention preferably has an oxidation-reduction potential which is a value around the palladium elution potential, 0.915 V (vs. SHE), and less than the platinum elution potential, 1.188 V (vs. SHE).

Concrete examples of the acid solution include nitric acid, sulfuric acid, perchloric acid, hydrochloric acid and hypochlorous acid. From the viewpoint of having oxidation power which is sufficient to dissolve palladium, nitric acid is particularly preferred.

The detailed conditions of the acid treatment, such as the concentration of the acid solution, the temperature of the same and the contact time with the acid solution, are preferably determined so that the ratio of the mass of the platinum-containing outermost layer eluted by the acid solution, Ms, to the mass of the palladium-containing particle eluted by the acid solution, Mc, becomes preferably 0.4 to 2.0, particularly preferably 0.5 to 1.5 (hereinafter the ratio may be referred to as "Ms/Mc ratio"). When the Ms/Mc ratio is less than 0.4, the amount of palladium eluted from the palladium-containing particle is too large, resulting in a possible decrease in production efficiency. When the Ms/Mc ratio is more than 2.0, the elution amount of the palladium-containing particle is too small, resulting in a possible failure to obtain sufficient defective region mending effects, or the elution amount of the platinum-containing outermost layer is too large, resulting in a possible decrease in catalytic activity.

In particular, the concentration of the acid solution is as follows. For example, in the case of using nitric acid as the acid solution, the concentration of the nitric acid is preferably $1.0 \times 10^{-4}$ to 2 mol/L, particularly preferably $1.0 \times 10^{-3}$ to 1 mol/L, more particularly preferably $1.0 \times 10^{-2}$ to $1.0 \times 10^{-1}$ mol/L. In the case of using sulfuric acid as the acid solution, the concentration of the sulfuric acid is preferably $1.0 \times 10^{-4}$ to mol/L, particularly preferably $1.0 \times 10^{-3}$ to 1 mol/L, more particularly preferably $1.0 \times 10^{-2}$ to $1.0 \times 10^{-1}$ mol/L.

The temperature of the acid solution is preferably 40° C. or more, particularly preferably 50° C. or more, more particularly preferably 60° C. or more, because the defective region can be mended effectively and efficiently. Also, the temperature is preferably 90° C. or less, particularly preferably 80° C. or less, more particularly preferably 60° C. or less, from the viewpoint of preventing sintering of the fine catalyst particle, aggregation of the catalyst precursor, etc.

The time for bringing the catalyst precursor into contact with the acid solution can be appropriately determined depending on the type or concentration of the acid, the temperature of the acid solution, etc. For example, it can be about 30 minutes to 2 hours.

The Ms/Mc ratio can be also controlled by the method for combining two or more kinds of acid and controlling the ratio of them, the method for controlling the atmosphere of the acid solution by bubbling or the like, etc., besides the concentration of the acid solution, the temperature of the same, the type of the acid, the contact time, etc.

Examples of the method for optimizing the acid treatment conditions include the method for evaluating catalytic activity by a rotating disk electrode (hereinafter may be referred to as RDE) method.

No particular limitation is imposed on the method for bringing the catalyst precursor into contact with the acid solution. From the viewpoint of sufficient progress of the acid treatment, the method for immersing the catalyst precursor in the acid solution is preferred. During the immersion, it is preferable to disperse and stir the acid solution by means of an ultrasonic homogenizer, a magnetic stirrer, a motor furnished with stirring blades, etc.

As described above, the acid may serve as a catalyst for promoting the bond formation between the carrier and the additive. For example, when citric acid is used as the additive, the acid can serve as a catalyst for dehydration-condensation reaction between the carboxyl or hydroxyl group on the carrier surface and the hydroxyl or carboxyl group in the citric acid. When much of the additive remains before the acid treatment step, the additive forms a covalent bond and so on with the carrier by the acid treatment, so that the amount of the additive remaining in the catalyst precursor in the form of additive-modified product increases. Therefore, when the acid treatment is carried out in the present invention, it is important to carry out the water washing step before the acid treatment.

(b) Hydrogen Bubbling Step

The catalyst production method of the present invention preferably has the step of bubbling a hydrogen gas into a dispersion of the catalyst precursor after the acid treatment step and before the firing step. The oxide coating on the surface of the catalyst precursor can be effectively removed in the firing step by providing such a bubbling step and thus adsorbing hydrogen onto the surface of the catalyst precursor subjected to the acid treatment.

The dispersion of the catalyst precursor is not particularly limited and can be appropriately selected. A preferred dispersion medium is an acid solution. As the acid solution, for example, there may be used one which is the same as the acid solution used in the acid treatment.

The concentration of the hydrogen gas is not particularly limited. For example, it can be about 10 to 90% by volume. The time for bubbling the hydrogen gas can be appropriately determined depending on the hydrogen gas concentration, the amount of the catalyst precursor to be processed, etc. For example, it can be about 0.5 to 1 hour.

In the case of including the bubbling step, it is preferable to provide the washing step as described above before bubbling.

Before bubbling the hydrogen gas, it is preferable to bubble an inert gas into the dispersion of the catalyst precursor. This is because it is possible to increase safety during the hydrogen gas bubbling. From the same viewpoint, it is preferable to bubble an inert gas after the hydrogen gas bubbling. As the inert gas, a common gas such as nitrogen gas or argon gas can be used. The bubbling time and so on can be appropriately determined.

It is also preferable to provide water washing and drying steps as described above after the hydrogen gas bubbling. This is because it is possible to conduct the successive firing step, efficiently.

(c) Firing Step

The firing step is a step of firing the catalyst precursor at a temperature of 80° C. or more and less than 200° C. in a reducing gas atmosphere after the hydrogen bubbling step.

The type, concentration and so on of the reducing gas atmosphere are not particularly limited as long as the reducing gas atmosphere contains a reducing gas. An example of the reducing gas is $H_2$ gas.

The concentration of the reducing gas atmosphere is preferably 1% by volume or more, particularly preferably 2.5% by volume or more, from the viewpoint of efficient removal of the oxide coating.

The firing temperature is needed to be in a range of 80° C. or more and less than 200° C. From the viewpoint of platinum surface diffusion initiating energy, it is preferably 90° C. or more, particularly preferably 100° C. or more. Also from the viewpoint of maintaining the core-shell structure, it is preferably 170° C. or less, particularly preferably 150° C. or less.

The firing time can be appropriately determined depending on the firing temperature, the amount of a sample, etc. For example, it can be about one to three hours.

When the catalyst for fuel cells containing the fine catalyst particles having the core-shell structure has a mass activity of 450 ($A/g_{Pt}$) or more and a specific activity of 4.0 ($A/m^2$) or more, it is estimated that the catalyst for fuel cells is a catalyst produced by firing at a temperature of 80° C. or more and less than 200° C. This is because if fired at temperatures other than such a relatively low firing temperature, it is difficult to maintain the core-shell structure and to exhibit excellent catalytic activity, therefore. In the present invention, when the catalyst precursor is fired under such a low temperature condition, the carrier supporting the fine catalyst particles can obtain a larger BET specific surface area than ever before.

3. Fuel Cell

The fuel cell of the present invention is a fuel cell comprising a unit cell, which comprises a membrane electrode assembly in which an anode electrode comprising at least an anode catalyst layer is disposed on one side of a polyelectrolyte membrane and a cathode electrode comprising at least a cathode catalyst layer is disposed on another side of the polyelectrolyte membrane, wherein the above "1. Catalyst for fuel cells" or a catalyst for fuel cells produced by the above "2. Method for producing a catalyst for fuel cells" is contained in at least any one of the anode catalyst layer and the cathode catalyst layer.

Figure 1:
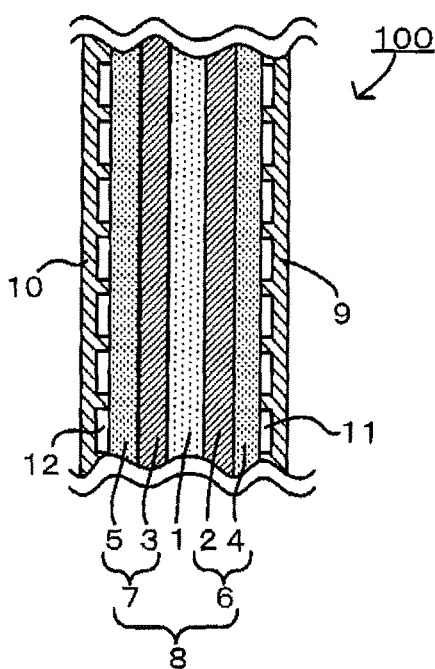
FIG. 1 is a view showing an example of the unit cell of the fuel cell of the present invention, and it is also a view schematically showing a section of the unit cell cut along a laminating direction.

FIG. 1 is a view showing an example of the unit cell of the fuel cell of the present invention, and it is also a view schematically showing a section of the unit cell cut along a laminating direction. A membrane electrode assembly 8 includes a hydrogen ion-conductive polyelectrolyte membrane (hereinafter may be simply referred to as electrolyte membrane) 1 and a pair of a cathode electrode 6 and an anode electrode 7 which sandwich the electrolyte membrane 1. A unit cell 100 includes the membrane electrode assembly 8 and a pair of separators 9 and 10 which sandwich the membrane electrode assembly 8 from the outside of the electrodes. Gas channels 11 and 12 are disposed at the boundaries of the separators and the electrodes. In general, a laminate of a catalyst layer and a gas diffusion layer stacked in this order from closest to the electrolyte membrane side, is used as the electrodes. That is, the cathode electrode 6 includes a laminate of a cathode catalyst layer 2 and a gas diffusion layer 4, and the anode electrode 7 includes an anode catalyst layer 3 and a gas diffusion layer 5. The catalyst for fuel cells according to the present invention is used in at least any one of the anode catalyst layer and the cathode catalyst layer.

The polyelectrolyte membrane is a polyelectrolyte membrane used in fuel cells. Examples thereof include fluorine-based polyelectrolyte membranes containing fluorine-based polyelectrolytes such as perfluorocarbon sulfonic acid resin as typified by Nafion (trademark), and hydrocarbon-based polyelectrolyte membranes containing hydrocarbon-based polyelectrolytes obtained by introducing a protonic acid group (proton conductive group) such as sulfonic acid group, carboxylic acid group, phosphoric acid group or boronic acid group to an engineering plastic such as polyether ether ketone, polyether ketone, polyether sulfone, polyphenylene sulfide, polyphenylene ether or polyparaphenylene or to a commodity plastic such as polyethylene, polypropylene or polystyrene.

Each of the electrodes includes the catalyst layer and the gas diffusion layer.

Both the anode catalyst layer and the cathode catalyst layer can be formed using a catalyst ink containing a catalyst, an electroconductive material and a polyelectrolyte. As the polyelectrolyte, there may be used the same material as the above-mentioned polyelectrolyte membrane. As the catalyst, the catalyst for fuel cells according to the present invention is used.

The catalyst for fuel cells according to the present invention can be used for only the anode catalyst layer, only the cathode catalyst layer, or both the anode catalyst layer and the cathode catalyst layer. When the catalyst for fuel cells according to the present invention is used for only the anode catalyst layer, a different catalyst is used for the cathode catalyst layer. When the catalyst for fuel cells according to the present invention is used for only the cathode catalyst layer, a different catalyst is used for the anode catalyst layer.

As the different catalyst, such a catalyst that a catalytic component is supported on electroconductive particles is generally used. The catalytic component is not particularly limited, as long as it has catalytic activity to the oxidation reaction of a fuel supplied to the anode electrode or to the reduction reaction of an oxidant supplied to the cathode electrode, and there may be used a catalyst that is generally used for solid polymer type fuel cells. For example, there may be used platinum or an alloy of platinum and a metal such as ruthenium, iron, nickel, manganese, cobalt or copper. As the electroconductive particles which serve as the catalyst carrier, there may be used an electroconductive carbonaceous material such as carbon particles or carbon fibers (e.g., carbon black) or a metal material such as metal particles or metal fibers. The electroconductive material also has a role in imparting electroconductivity to the catalyst layer.

The method for forming the catalyst layer is not particularly limited. For example, the catalyst layer can be formed on a gas diffusion sheet by applying the catalyst ink to a surface of the gas diffusion sheet and drying the applied ink, or the catalyst layer can be formed on the polyelectrolyte membrane by applying the catalyst ink to a surface of the polyelectrolyte membrane and drying the applied ink. Or, the catalyst layer can be formed on the polyelectrolyte membrane or the gas diffusion sheet by the following method: a transfer sheet is produced by applying the catalyst ink to a surface of a transfer substrate and drying the applied ink; the transfer sheet is attached to the polyelectrolyte membrane or the gas diffusion sheet by hot pressing or the like; and the substrate film of the transfer sheet is removed, thereby forming the catalyst layer on the polyelectrolyte membrane or the gas diffusion sheet.

The catalyst ink can be obtained by dispersing the above-mentioned catalyst, an electrolyte for electrodes, and so on in a solvent. The solvent for the catalyst ink can be appropriately selected. For example, there may be used an organic solvent such as alcohol (e.g., methanol, ethanol, propanol), N-methyl-2-pyrrolidone (NMP) or dimethylsulfoxide (DMSO), a mixture of the organic solvents, or a mixture of water and any of the organic solvents. In addition to the catalyst and the electrolyte, the catalyst ink can contain other components such as a binder and a water repellent resin, as needed.

The method for applying the catalyst ink, the method for drying the catalyst ink, etc., can be appropriately selected. As the catalyst ink applying method, for example, there may be mentioned a spraying method, a screen printing method, a doctor blade method, a gravure printing method and a die coating method. As the catalyst ink drying method, for example, there may be mentioned reduced-pressure drying, heat drying and heat drying under reduced pressure. The detailed conditions of the reduced-pressure drying or the heat drying are not particularly limited and can be appropriately determined. The thickness of the catalyst layer is not particularly limited and can be about 1 to 50 μm.

As the gas diffusion sheet for forming the gas diffusion layer, there may be mentioned one having gas diffusivity which enables efficient fuel supply to the catalyst layer, electroconductivity, and strength required of the material for constituting the gas diffusion layer. Examples thereof include carbonaceous porous materials such as carbon paper, carbon cloth and carbon felt, and electroconductive porous materials such as metal mesh and metal porous materials made of metals such as titanium, aluminum and alloys thereof, nickel, nickel-chromium alloy, copper and alloys thereof, silver, zinc alloy, lead alloy, niobium, tantalum, iron, stainless-steel, gold, platinum, etc. The thickness of the electroconductive porous material is preferably about 50 to 500 μm.

The gas diffusion sheet may be made of a single layer of the electroconductive porous material, or a water repellent layer can be provided on a catalyst layer-facing side of the sheet. In general, the water repellent layer has a porous structure that contains an electroconductive powder and granular material such as carbon particles or carbon fibers, a water repellent resin such as polytetrafluoroethylene (PTFE), etc. The water repellent layer is not always necessary; however, it has such an advantage that the drainage property of the gas diffusion layer can be increased, with appropriately maintaining the water content in the catalyst layer and the polyelectrolyte membrane, and the electrical contact between the catalyst layer and the gas diffusion layer can be improved.

The polyelectrolyte membrane having the catalyst layer formed thereon by the above-mentioned method and the gas diffusion sheet can be appropriately stacked and attached to each other by hot pressing or the like, thereby obtaining a membrane electrode assembly.

The membrane electrode assembly thus produced is preferably sandwiched between a pair of separators having a reaction gas channel, thereby forming a unit cell. As the separators, there may be used separators having electroconductivity and gas sealing properties and being able to serve as a current collector and gas sealer, such as carbon separators containing carbon fibers at high concentration and being made of a composite with a resin, or metal separators made of a metal material. Examples of the metal separators include separators made of a metal material with excellent corrosion resistance and separators being coated with carbon or a metal material with excellent corrosion resistance and thus having a coating thereon for increased corrosion resistance. The above-described reaction gas channel can be formed by appropriately cutting or compression molding the separators, for example.

By carrying out IV measurement using the membrane electrode assembly, the gas diffusivity of the membrane electrode assembly can be evaluated. In particular, gas diffusion resistance R (sec/m) can be obtained by substituting limiting current value $I_{lim}$ (A/cm$^2$) obtained by the IV measurement, oxygen partial pressure $P_{O2}$ (KPa-abs) and cell temperature T (K), both of which are evaluation conditions, Faraday constant F (=96,485 (C/mol)) and gas constant R (=8.314 (J/mol·K)) into the following formula (3):

$$R(\text{sec/m}) = (4F \times P_{O2} \times 1000)/(R \times T \times I_{lim} \times 10000) \quad \text{Formula (3)}$$

EXAMPLES

Hereinafter, the present invention will be described in more detail, by way of examples and comparative examples. However, the present invention is not limited to these examples.

1. Production of Catalyst for Fuel Cells

Example 1

1-1. Preparation of Material

First, palladium was supported on a carbon carrier (Vulcan) by a known method. A supported product thus obtained was appropriately washed and then fired, thereby preparing a carbon-supported palladium particle powder.

Next, 10 g of the carbon supported palladium particle powder was dispersed in 1 L of 0.05 mol/L sulfuric acid, and a dispersion thus obtained was put in an electrochemical reactor. An inert gas ($N_2$ gas) was sufficiently bubbled into the dispersion, thereby deoxidizing the dispersion. Then, a 0.1 to 1.1 V (vs. RHE) square wave pattern potential cycle was carried out, thereby removing impurities and oxides from the surface of the palladium particles.

1-2. Covering of Palladium Particles with Copper Monatomic Layer

A predetermined amount of $CuSO_4 \cdot 5H_2O$ was added to the electrochemical reactor so as to have a copper ion concentration of 0.05 mol/L and then dissolved. The adding and dissolving of $CuSO_4 \cdot 5H_2O$ was carried with bubbling $N_2$ gas into the mixture. Then, a predetermined potential was applied to a working electrode and maintained until the current value came close to 0 A and reached a plateau, that is, until a reaction ($Cu^{2+}+2e^- \rightarrow Cu$) ends. The predetermined potential applied to the working electrode is a potential that is approximately equal to a UPD potential confirmed by rotating disk electrode (RDE) measurement so that only one atomic layer of copper was deposited on the surface of the palladium particles. By this operation, the palladium particles were covered with a copper monatomic layer.

1-3. Substitution of Copper Monatomic Layer with Platinum Outermost Layer

A mixture of 3.32 g of $K_2PtCl_4$, 75 g of citric acid and 100 mL of deoxidized sulfuric acid was gradually added to the electrochemical reactor. After the addition was completed, the reaction mixture was kept stirred until the self-potential of the reaction mixture reached a plateau (that is, until no variation was seen in the self-potential). By this operation, the copper monatomic layer on the surface of the palladium particles was substituted with a platinum layer, thereby synthesizing fine catalyst particles.

1-4. Cool Water Washing and Warm Water Washing

The reaction mixture containing the fine catalyst particles synthesized above was filtered. Then, the resulting product was washed with 4 L of pure water (cool water) (cool water washing).

After the cool water washing, the product was put in 1 L of pure water. The solid was sufficiently dispersed in the pure water with an ultrasonic homogenizer. Then, with stirring the resulting dispersion, the temperature was increased to 60° C. and kept at the same temperature for one hour (warm water washing). Next, 40 mL of the supernatant (washing water) of the dispersion was collected and filtered using a syringe furnished with a filter. Then, the conductivity of the washing water was measured under the following conditions.

Measurement device: Conductivity meter ("CONDUCTIVITY METER AOL-40" manufactured by DKK)

Measurement temperature: 25° C.

When the conductivity of the washing water was more than 10 μS/cm, the amount of the citric acid remaining in the catalyst was considered to be more than 2.5% by mass. In this case, the dispersion was filtered, and the resulting product was put in 1 L of pure water again and repeatedly subjected to the warm water washing. On the other hand, when the conductivity of the washing water was 10 μS/cm or less, the amount of the citric acid remaining in the catalyst was considered to be 2.5% by mass or less. In this case, the dispersion was filtered, and the warm water washing was completed.

Figure 7:
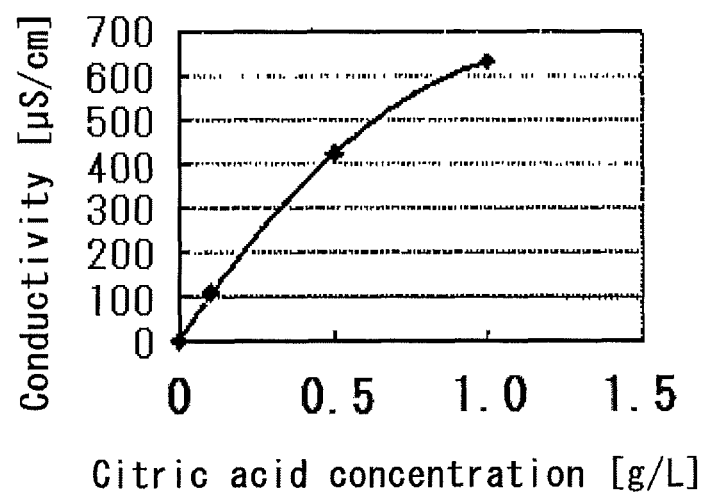
FIG. 7 shows a calibration curve of conductivity of washing water with respect to citric acid concentration.

FIG. 7 shows a calibration curve of the conductivity (μS/cm) of the washing water with respect to the citric acid concentration (g/L). The approximate formula of the calibration curve is as follows.

$$y=-423.18x^2+1051.1x+3.7025 (R^2=0.9999)$$

Using FIG. 7, the conductivity of the washing water was converted into the citric acid concentration. The conductivity of the washing water and the citric acid concentration are shown in Table 2.

1-5. Acid Treatment and Hydrogen Bubbling

After the warm water washing, the product was collected, put in pure water and then dispersed with the ultrasonic homogenizer. Then, a predetermined amount of concentrated nitric acid was added thereto, thereby preparing a 1 mol/L nitric acid dispersion. The solid concentration of the nitric acid dispersion was set to 1 g/mL. The prepared dispersion was stirred for 30 minutes at a temperature of 60° C. Then, the nitric acid dispersion was filtered and repeatedly washed with pure water until the filtrate became neutral.

After the washing, the resulting powder catalyst was put in 1 L of pure water and dispersed with the ultrasonic homogenizer. Thereafter, first, $N_2$ gas was bubbled into the dispersion for 30 minutes. Next, $H_2$ gas was bubbled into the dispersion for 30 minutes. In addition, $N_2$ gas was bubbled into the dispersion for 3 minutes. After the bubbling, the dispersion was filtered and then washed with pure water. A catalyst cake thus obtained was dried under reduced pressure at 60° C. for 8 hours or more, thereby obtaining a powder catalyst.

1-6. Firing

After the hydrogen bubbling, 5 g of the powder catalyst was put in a firing furnace under an inert gas (Ar) atmosphere. The firing furnace was placed under 2.5% $H_2$/Ar gas atmosphere. The temperature of the firing furnace was increased to 150° C. and then left for one hour, thereby firing the powder catalyst. The powder catalyst was air-cooled after the firing, thereby producing the catalyst for fuel cells of Example 1.

Comparative Example 1

The catalyst for fuel cells of Comparative Example 1 was produced by carrying out the synthesis of the fine catalyst particles, the acid treatment, the hydrogen bubbling and the firing in the same manner as Example 1, except that the warm water washing was not carried out.

The conductivity of the washing water used in the cool water washing was measured under the same conditions as Example 1 and converted into the citric acid concentration using FIG. 7. The conductivity and citric acid concentration of the washing water are shown below in Table 2.

Comparative Example 2

First, the first step to the cool water washing step were carried out in the same manner as Example 1.

Next, after the cool water washing, the resulting product was put in 1 L of pure water. The solid was sufficiently dispersed in the pure water with the ultrasonic homogenizer. Then, with stirring the resulting dispersion, the temperature was increased to 60° C. and kept at the same temperature for one hour (warm water washing). Next, 40 mL of the supernatant (washing water) of the dispersion was collected and filtered using a syringe furnished with a filter. Then, the conductivity of the washing water was measured under the same conditions as Example 1. Therefore, the conductivity of the dispersion was 164 μS/cm. Then, the dispersion was filtered, and the warm water washing was completed. The conductivity of the washing water was converted into the citric acid concentration using FIG. 7. The conductivity and citric acid concentration of the washing water are shown in Table 2.

Thereafter, the catalyst for fuel cells of Comparative Example 2 was produced by carrying out the acid treatment, hydrogen bubbling and firing in the same manner as Example 1.

Comparative Example 3

The catalyst for fuel cells of Comparative Example 3, which is a platinum-cobalt alloy catalyst, was produced by the methods described under "2. Experimental Details" and "2.1 Catalyst Preparation" in a publicly known document (Platinum Metals Rev., 2010, 54, (4), 223-232).

2. Evaluation of Catalyst for Fuel Cells

The BET specific surface areas of the catalysts for fuel cells of Example 1 and Comparative Examples 1 to 3 were measured. The citric acid samples collected in the steps of Example 1 were quantitated. The details are as follows.

2-1. Measurement of BET Specific Surface Area

First, the BET specific surface area of the carbon carrier (Vulcan) contained in the material was measured with an automatic specific surface area/pore distribution measuring device (product name: Tristar 3020; manufactured by: Micromeritics). The measured BET specific surface area was considered as S1 ($m^2$/g-carbon).

Next, the metal supported ratio x (% by mass) of each catalyst for fuel cells was measured by ICP-MS. Also, the BET specific surface area of each catalyst for fuel cells was measured. The measured BET specific surface area was considered as S ($m^2$/g-catalyst).

The BET specific surface area S2 ($m^2$/g-carbon) of the carbon carrier of each catalyst for fuel cells was calculated by the following formula (2) from the BET specific surface area S and the metal supported ratio x:

$$S2 = S \times \{(100-x)/100\} \quad \text{Formula (2)}$$

As for Example 1, the BET specific surface area of the carbon carrier of the catalyst precursor was calculated at each production step. That is, the BET specific surface area S and the metal supported ratio x were measured (a) after the supporting of the palladium, (b) after the firing after the supporting of the palladium, (c) after carrying out the potential cycle, (d) after the Cu-UPD, (e) after the substitution with the platinum, (f) after the cool water washing, (g) after the warm water washing, (h) after the acid treatment and (i) after the hydrogen bubbling. Then, the BET specific surface areas of the carbon carrier of the catalyst precursor were calculated by the above formula (2). The order (a) to (i) corresponds to the order of the production steps.

Figure 2:
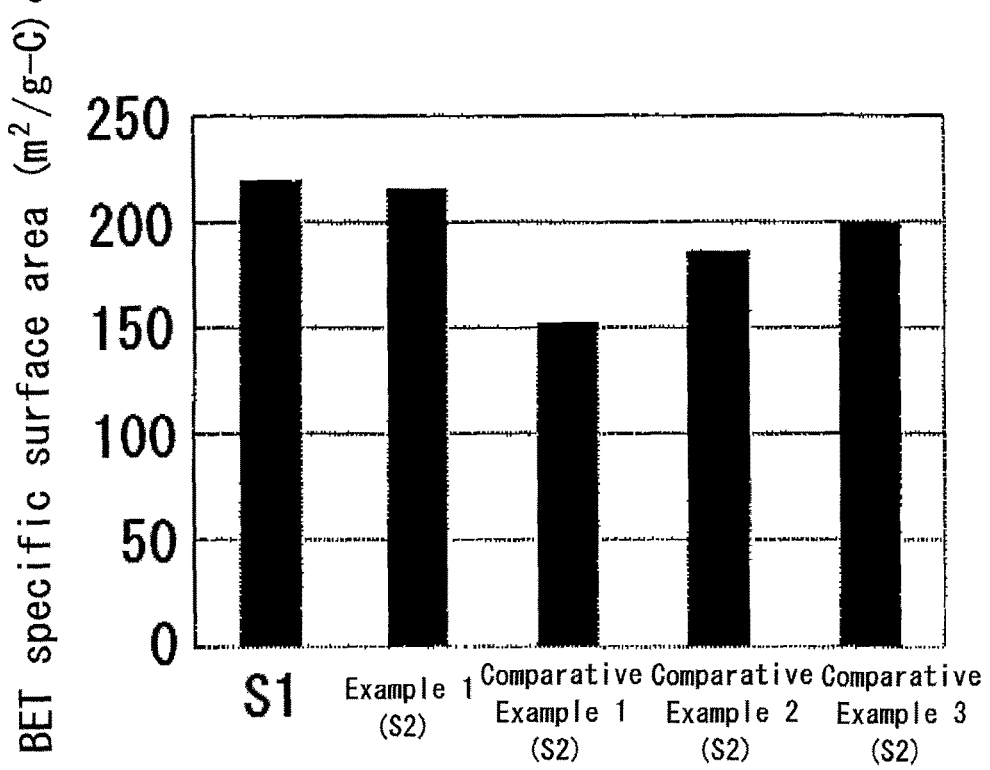
FIG. 2 is a bar graph comparing BET specific surface areas S2 of catalysts for fuel cells of Example 1 and Comparative Examples 1 to 3.

FIG. 2 is a bar graph comparing the BET specific surface areas S2 of the catalysts for fuel cells of Example 1 and Comparative Examples 1 to 3. As a reference, the BET specific surface area S1 of the carbon carrier (Vulcan) is shown side by side.

The BET specific surface area S2 of Comparative Example 1 is 151 ($m^2$/g-carbon). This is the smallest value among Example 1 and Comparative Examples 1 to 3. Therefore, it is clear that the citric acid was not sufficiently removed in Comparative Example 1 in which the warm water washing was not carried out, so that the BET specific surface area became the smallest.

The BET specific surface area S2 of Comparative Example 2 is 180 ($m^2$/g-carbon) and less than 200 ($m^2$/g-carbon). Therefore, it is clear that the citric acid was not sufficiently removed in Comparative Example 2 in which the warm water washing was completed when the conductivity of the dispersion was as high as 164 μS/cm, so that the BET specific surface area was small.

Meanwhile, the BET specific surface area S2 of Example 1 is 215 ($m^2$/g-carbon). The BET specific surface area S2 of the Comparative Example 3 is 200 ($m^2$/g-carbon). They are both 200 ($m^2$/g-carbon) or more. Since the BET specific surface area S1 of the carbon, which is the material for the catalyst, is 220 ($m^2$/g-carbon), the BET specific surface area S2 of Example 1 and that of Comparative Example 3 are both 90% or more of the BET specific surface area S1.

Figure 3:
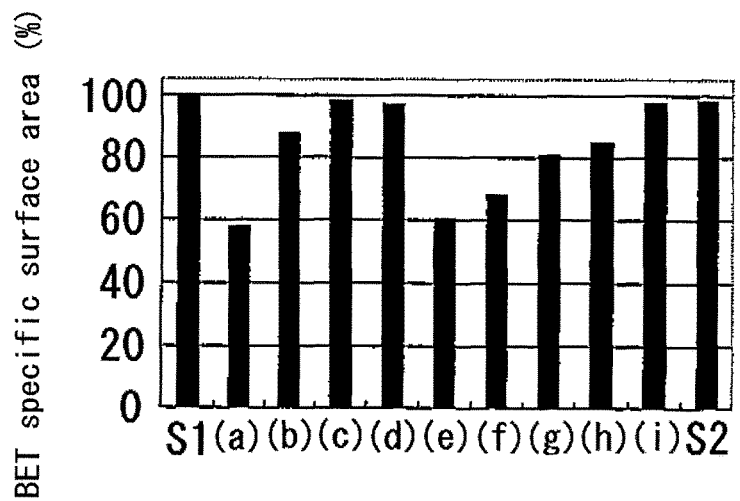
FIG. 3 is a bar graph comparing BET specific surface areas at production steps in Example 1.

FIG. 3 is a bar graph comparing the BET specific surface areas at the production steps in Example 1, and compares the BET specific surface area S1 of the carbon carrier (Vulcan), the BET specific surface areas of the catalyst precursor at the steps (a) to (i), and the BET specific surface area S2 of the catalyst for fuel cells thus obtained. Each of the BET specific surface areas is expressed as a relative value when the BET specific surface area S1 of the carbon carrier (Vulcan) is considered as 100%.

First, (a) after the supporting of the palladium, the BET specific surface area decreased from 100% to 59%. This is because the additive and so on, which were added when supporting the palladium on the carrier material, attached to the carrier. Next, the BET specific surface area increased to 99% through (b) the firing after the supporting of the palladium and (c) the carrying out of the potential cycle. This is because impurities such as palladium oxide and excess functional groups were removed from the carrier surface by the potential cycle. Then, the BET specific surface area decreased to 60% through (d) the Cu-UPD and (e) the substitution with the platinum. As described above, this is because the citric acid physically adsorbed on the carrier surface. Thereafter, the BET specific surface area increased to 68% by (f) the cool water washing, 81% by (g) the warm water washing, 85% by (h) the acid treatment, and 98% by (i) the hydrogen bubbling, and the BET specific surface area (S2) returned to almost 100% by the firing.

2-2. Quantitation of Citric Acid

In Example 1, the washing water and filtrate used from the cool water washing step to the hydrogen bubbling step were collected at each process and analyzed by ion chromatography, thereby quantitating the amount of the citric acid removed from the catalyst precursor. Detailed quantitation conditions are as follows.

Device: Ion chromatography device (product name: DX-600; manufactured by: DIONEX)

Separation column: IonPac AG11-HC+AS11-HC (2 mm diameter) (manufactured by: DIONEX)

Eluent: KOH gradient, 0.38 mL/min

Detector: Electrical conductivity detector

The following Table 1 shows the citric acid amount quantitated by ion chromatography and the citric acid removal ratio at each step. In Table 1, "N.D" indicates that the amount was below the detection limit. Also in Table 1, "(f) Cool water washing", "(g) Warm water washing", "(h) Acid treatment" and "(i) Hydrogen bubbling" correspond to the steps (f) to (i) shown in FIG. 3, respectively.

TABLE 1

|  | Amount of citric acid quantitated by ion chromatography (g) | Removal ratio of citric acid (%) |
|---|---|---|
| (f) Cool water washing | 74.5 | 99.3 |
| (g) Warm water washing | 0.202 | 0.27 |
| (h) Acid treatment | N.D | — |
| (i) Hydrogen bubbling | N.D | — |
| Total | 74.7 | 99.6 |

As shown in Table 1, while the amount of the citric acid quantitated from the washing water used in (f) the cool water washing was 74.5 g, the amount of the citric acid quantitated from the washing water used in (g) warm water washing was 0.202 g. Therefore, with respect to the amount of the added citric acid (75 g), the total amount of the citric acid and derivatives thereof that were not removed and remained in the catalyst for fuel cells is 0.3 g. Therefore, the total mass of the thus-obtained catalyst for fuel cells is the sum of the mass of the carbon-supported palladium particle powder used as the material, which is 10 g, the mass of the platinum covering the palladium particles (measured by ICP-MS), which is 2 g, and the total mass of the remaining citric acid and derivatives thereof, which is 0.3 g. Therefore, as described above, when the conductivity of the washing water used in (g) the warm water washing is 10 μS/cm or less, the amount of the remaining citric acid is as follows:

$\{0.3/(10+2+0.3)\} \times 100 = 2.4$(% by mass)

3. Production of Membrane Electrode Assembly

Example 2

First, 0.9 g of the catalyst for fuel cells of Example 1 and 14.24 g of water were stirred by centrifugal stirring to mix the catalyst for fuel cells with the water well. Next, 8.16 g of ethanol was added to the mixture, and the mixture was entirely and similarly and uniformly mixed also by centrifugal stirring. In addition, 1.9 g of an electrolyte (product name: DE2020CS; manufactured by: DuPont) was added to the mixture, and the mixture was also uniformly mixed by centrifugal stirring, thereby obtaining a catalyst ink material.

Under a dry atmosphere, 20 mL of the catalyst ink material and 60 g of PTFE grinding balls (2.4 mm diameter) were put in a PTFE pot, and the pot was hermetically closed. Then, the container was attached to a planetary ball mill and subjected to mechanical milling under a plate rotational frequency condition of 600 rpm, a temperature condition of 20° C. and a treatment time condition of one hour.

After the mechanical milling was completed, the mixture in the container was filtered with a mesh to remove the balls, thus obtaining a catalyst ink.

The catalyst ink was filled into a spray gun (product name: Spectrum S-920N; manufactured by: Nordson) and applied to both sides of an electrolyte membrane (product name: NR211; manufactured by: DuPont) so that the catalyst amount was 300 to 500 μg/cm², thus obtaining the membrane electrode assembly of Example 2.

Comparative Example 4

The membrane electrode assembly of Comparative Example 4 was obtained in the same manner as Example 2, except that 0.9 g of the catalyst for fuel cells of Comparative Example 1 was used in place of 0.9 g of the catalyst for fuel cells of Example 1.

Comparative Example 5

The membrane electrode assembly of Comparative Example 5 was obtained in the same manner as Example 2, except that 0.9 g of the catalyst for fuel cells of Comparative Example 2 was used in place of 0.9 g of the catalyst for fuel cells of Example 1.

Comparative Example 6

The membrane electrode assembly of Comparative Example 6 was obtained in the same manner as Example 2, except that 0.9 g of the catalyst for fuel cells of Comparative Example 3 was used in place of 0.9 g of the catalyst for fuel cells of Example 1.

4. Evaluation of Membrane Electrode Assemblies

To evaluate the gas diffusivity of the membrane electrode assemblies, IV measurement was carried out on the membrane electrode assemblies of Example 2 and Comparative Examples 4 and 5, under the following conditions.

Atmosphere: 2% $O_2$
Temperature: 40° C.
Humidity: Anode/cathode dew point 55° C.

Gas diffusion resistance R (sec/m) was calculated by substituting limiting current value $I_{lim}$ (A/cm²) obtained by the IV measurement, oxygen partial pressure $P_{O2}$ (KPa-abs) and cell temperature T (K), both of which are evaluation conditions, Faraday constant F (=96,485 (C/mol)) and gas constant R (=8.314 (J/mol·K)) into the following formula (3):

$R(\text{sec/m}) = (4F \times P_{O2} \times 1000)/(R \times T \times I_{lim} \times 10000)$  Formula (3)

Figure 4:
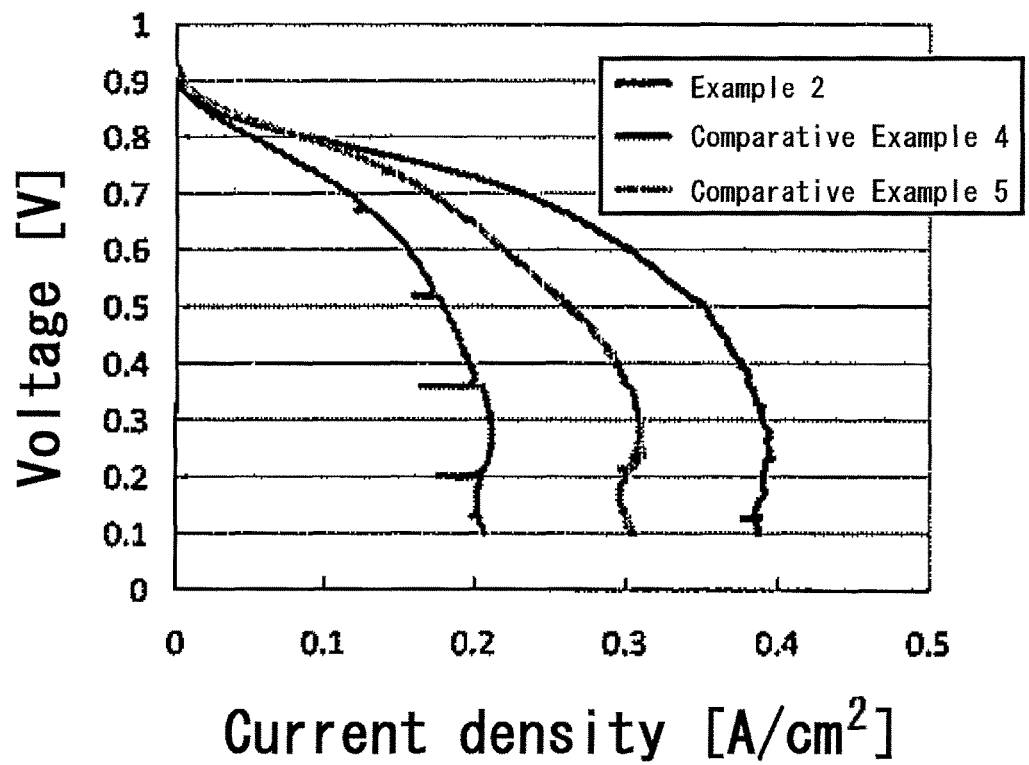
FIG. 4 is a graph showing overlapped IV curves of membrane electrode assemblies of Example 2 and Comparative Examples 4 and 5 under a low oxygen concentration condition.

FIG. 4 is a graph showing overlapped IV curves of the membrane electrode assemblies of Example 2 and Comparative Examples 4 and 5 under a low oxygen concentration condition. In FIG. 4, one having a current density of about 0.4 A/cm² at a voltage of 0.1 V is the data of Example 2; one having a current density of about 0.3 A/cm² at a voltage of 0.1 V is the data of Comparative Example 5; and one having a current density of about 0.2 A/cm² at a voltage of 0.1 V is the data of Comparative Example 4.

As shown in FIG. 4, for example, at a voltage of 0.1 V, the current density of the membrane electrode assembly of Example 2 is twice the current density of the membrane electrode assembly of Comparative Example 4 and is 1.3 times higher than the current density of the membrane electrode assembly of Comparative Example 5.

Figure 5:
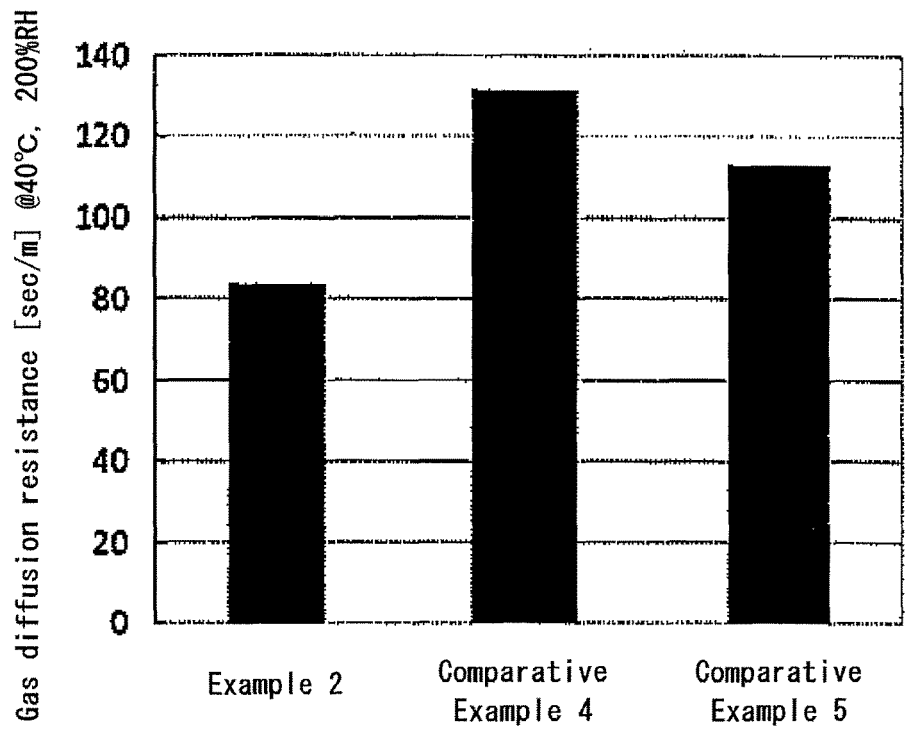
FIG. 5 is a bar graph comparing gas diffusion resistances of membrane electrode assemblies of Example 2 and Comparative Examples 4 and 5.

FIG. 5 is a bar graph comparing the gas diffusion resistances of the membrane electrode assemblies of Example 2 and Comparative Examples 4 and 5, which were obtained from the IV curves in FIG. 4. Table 2 shows the gas diffusion resistances of the membrane electrode assemblies of Example 2 and Comparative Examples 4 and 5, and the data on the washing water relating to the catalysts for fuel cells used in Example 2 and Comparative Examples 4 and 5. As for the data on the conductivity and citric acid concentration, the data of Example 1 and Comparative Example 2 are the data on the washing water used in the warm water washing, and the data of Comparative Example 1 is the data on the washing water used in the cool water washing.

TABLE 2

| | Data on washing water used in production of catalyst for fuel cells | | | Gas diffusion resistance (s/m) |
|---|---|---|---|---|
| | Experimental number | Conductivity of washing water (µS/cm) | Citric acid concentration (g/L) | |
| Example 2 | Example 1 | <10 | 0.016 | 83.4 |
| Comparative Example 4 | Comparative Example 1 | 452 | 0.39 | 131.2 |
| Comparative Example 5 | Comparative Example 2 | 164 | 0.14 | 112.7 |

According to Table 2, the washing water of Comparative Example 1 has a conductivity of 452 µS/cm and a citric acid concentration of 0.39 g/L. From the data on the washing water, it is clear that in Comparative Example 1 in which the warm water washing was not carried out, much of the citric acid and derivatives thereof remained in the catalyst for fuel cells. The membrane electrode assembly (Comparative Example 4) using such a catalyst for fuel cells of Comparative Example 1 has a gas diffusion resistance of 131.2 (sec/m) and this is the highest value among the membrane electrode assemblies of Example 2 and Comparative Examples 4 and 5.

Also, according to Table 2, the washing water of Comparative Example 2 has a conductivity of 164 µS/cm and a citric acid concentration of 0.14 g/L. From the data on the washing water, it is clear that in Comparative Example 2 in which the warm water washing was insufficient, much of the citric acid and derivatives thereof still remained in the catalyst for fuel cells. The membrane electrode assembly (Comparative Example 5) using such a catalyst for fuel cells of Comparative Example 2 has a gas diffusion resistance of 112.7 (sec/m) and this is a high value more than 100 (sec/m).

On the other hand, according to Table 2, the washing water of Example 1 has a conductivity of less than 10 µS/cm and a citric acid concentration of 0.016 g/L. From the data on the washing water, it is clear that the citric acid concentration can be reliably decreased by repeating the warm water washing, using the conductivity of the washing water as an indicator. The membrane electrode assembly (Example 2) using such a catalyst for fuel cells of Example 1 has a gas diffusion resistance of 83.4 (sec/m) and this is very small.

From the above, it is clear that compared to the membrane electrode assembly using the catalyst for fuel cells produced without the warm water washing (Comparative Example 4) and the membrane electrode assembly using the catalyst for fuel cells produced in such a manner that the warm water washing was completed when the conductivity of the washing water was high (Comparative Example 5), the gas diffusion resistance of the membrane electrode assembly using the catalyst for fuel cells produced in such a manner that the warm water washing was repeated until the conductivity of the washing water became sufficiently low (Example 2) is 64 to 74% smaller than Comparative Examples 4 and 5.

IV measurement was carried out under the following conditions, by supplying air to the membrane electrode assemblies of Example 2 and Comparative Examples 4 and 6.

Atmosphere: Air
Temperature: 40° C.
Humidity: Anode/cathode dew point 55° C.

Figure 6:
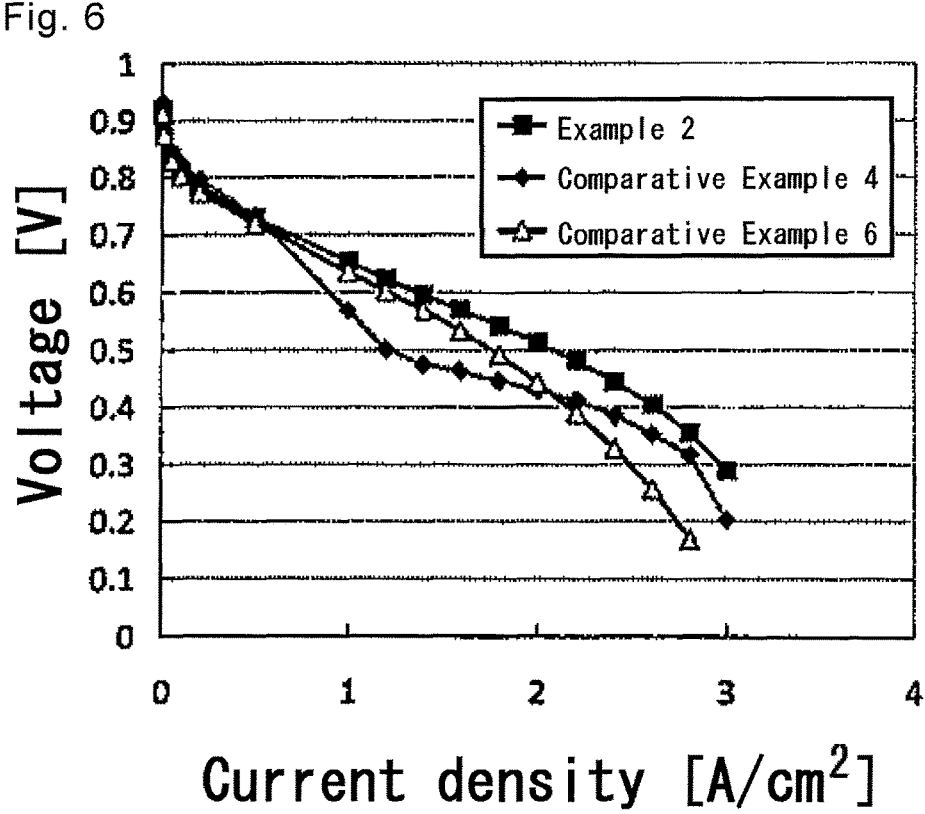
FIG. 6 is a graph showing overlapped IV curves of membrane electrode assemblies of Example 2 and Comparative Examples 4 and 6 in the air.

FIG. 6 is a graph showing overlapped IV curves of the membrane electrode assemblies of Example 2 and Comparative Examples 4 and 6 in the air. In FIG. 6, black square plots indicate the data of Example 2; black diamond plots indicate the data of Comparative Example 4; and white triangle plots indicate the data of Comparative Example 6.

As shown in FIG. 6, the membrane electrode assembly of Example 2 showed high voltage in a wider current density region than the membrane electrode assemblies of Comparative Examples 4 and 6. The IV characteristics of the membrane electrode assembly of Example 2 showed significant improvements particularly in the medium to high current density region (0.5 to 3 ($A/cm^2$)) to which gas diffusivity greatly contributes.

From the above, it is clear that compared to the membrane electrode assembly using the catalyst for fuel cells produced without the warm water washing (Comparative Example 4) and the membrane electrode assembly using the conventional platinum-cobalt alloy catalyst (Comparative Example 6), the membrane electrode assembly using the catalyst for fuel cells produced in such a manner that the warm water washing was repeated until the conductivity of the washing water become sufficiently low (Example 2) has excellent IV characteristics.

REFERENCE SIGNS LIST

1. Polyelectrolyte membrane
2. Cathode catalyst layer
3. Anode catalyst layer
4, 5. Gas diffusion layer
6. Cathode electrode
7. Anode electrode
8. Membrane electrode assembly
9, 10. Separator
11, 12. Gas channel
100. Unit fuel cell

The invention claimed is:

1. A method for producing a catalyst for fuel cells, the catalyst comprising fine catalyst particles, each of which comprises a palladium-containing particle and an outermost layer containing platinum and covering the palladium-containing particle, and a carrier on which the fine catalyst particles are supported, wherein the method comprises:
preparing a carrier on which palladium-containing particles are supported;
covering the palladium-containing particles with a monatomic layer;
synthesizing the fine catalyst particles by substituting the monatomic layer with the outermost layer containing platinum in the presence of an additive; and
washing a catalyst precursor in which the fine catalyst particles are supported on the carrier with water more than one time until a ratio of the total mass of the additive and a derivative thereof, both of which remain in the catalyst for fuel cells after the washing, to a total mass of the additive used for the synthesis of the fine catalyst particles, becomes 2.5% by mass or less determined by measuring the water.

2. The method for producing a catalyst for fuel cells according to claim 1, wherein the catalyst precursor is dispersed and washed in water by at least one method selected from a group consisting of an ultrasonic dispersion method, a method for pulverizing the catalyst precursor with a ball mill and then adding it to water, and a method for dispersing the catalyst precursor with a device that uses shear stress, when the catalyst precursor is washed with water.

3. The method for producing a catalyst for fuel cells according to claim 1, wherein a temperature of the water used for the washing is 30° C. or more and less than 100° C.

4. The method for producing a catalyst for fuel cells according to claim 1, wherein the additive is at least one surfactant selected from the group consisting of citric acid and ethylenediaminetetraacetic acid (EDTA), and sodium salts and potassium salts thereof.

5. The method for producing a catalyst for fuel cells according to claim 1, wherein an acid is further used when the monatomic layer is substituted with the outermost layer.

6. The method for producing a catalyst for fuel cells according to claim 1, wherein, the carrier on which the palladium-containing particles are supported is subjected to an acid treatment.

7. The method for producing a catalyst for fuel cells according to claim 1, wherein the ratio of the total mass of the additive and the derivate thereof, both of which remain in the catalyst for fuel cells after the washing, to the total mass of the additive used for the synthesis of the fine catalyst particles, is calculated based on a result of measuring a conductivity of the water used for washing.

8. The method for producing a catalyst for fuel cells according to claim 1, wherein the catalyst for fuel cells satisfies $0.9 \times S1 \leq S2$ in which S1 is a BET specific surface area of a material for the carrier, and S2 is a BET specific surface area of the carrier in the catalyst for fuel cells.

9. The method for producing a catalyst for fuel cells according to claim 1, wherein the method comprises firing the catalyst precursor at a temperature of 80° C. or more and less than 200° C. in a reducing gas atmosphere, after washing the catalyst precursor.

10. The method for producing a catalyst for fuel cells according to claim 9, wherein the catalyst has a mass activity of 450 $(A/g_{Pt})$ or more and a specific activity of a 4.0 (A/m2) or more.

* * * * *